US011293842B2

(12) United States Patent
Roos Launchbury et al.

(10) Patent No.: US 11,293,842 B2
(45) Date of Patent: Apr. 5, 2022

(54) MEASURING SYSTEM FOR INVESTIGATING CONCENTRATED AEROSOL PARTICLES IN THE GAS PHASE

(71) Applicant: SWISENS AG, Horw (CH)

(72) Inventors: David Roos Launchbury, Allenwinden (CH); Roger Waser, Ennetgurgen (CH); Erny Niederberger, Lucerne (CH); Reto Abt, Lucerne (CH); Philipp Burch, Baar (CH)

(73) Assignee: SWISENS AG, Horw (CH)

( * ) Notice: Subject to any disclaimer, the term of this patent is extended or adjusted under 35 U.S.C. 154(b) by 0 days.

(21) Appl. No.: 17/270,580

(22) PCT Filed: Aug. 27, 2019

(86) PCT No.: PCT/EP2019/072764
§ 371 (c)(1),
(2) Date: Feb. 23, 2021

(87) PCT Pub. No.: WO2020/043688
PCT Pub. Date: Mar. 5, 2020

(65) Prior Publication Data
US 2021/0341359 A1   Nov. 4, 2021

(30) Foreign Application Priority Data

Aug. 28, 2018   (EP) .................................. 18191098

(51) Int. Cl.
*G01N 15/06* (2006.01)
*G01N 1/22* (2006.01)
(Continued)

(52) U.S. Cl.
CPC .......... *G01N 1/2208* (2013.01); *B01D 45/08* (2013.01); *G01N 15/06* (2013.01);
(Continued)

(58) Field of Classification Search
CPC ... G01N 2015/1493; G01N 2015/1486; G01N 2015/0261; G01N 15/0255;
(Continued)

(56) References Cited

U.S. PATENT DOCUMENTS 4,689,052 A * 8/1987 Ogren ................ G01N 15/0255
                                                            55/338
4,968,885 A   11/1990 Willoughby
(Continued)

FOREIGN PATENT DOCUMENTS

| EP | 1109005 | 6/2001 |
| EP | 2679985 | 1/2014 |
| GB | 2297706 | 8/1996 |

*Primary Examiner* — Hoa Q Pham
(74) *Attorney, Agent, or Firm* — Defillo & Associates, Inc.; Evelyn A. Defillo

(57) ABSTRACT

The present invention relates to a measuring system for investigating concentrated, larger aerosol particles of an aerosol in the gas phase, having a multi-stage aerosol particle concentrator and also a measuring chamber for analyzing the larger aerosol particles, with at least one measuring device for the qualitative and/or quantitative determination of the aerosol particles, in particular in real time. The aerosol particle concentrator separates a larger part of the aerosol with fine particles and concentrate the larger aerosol particles in the smaller part of the aerosol. The aerosol particle concentrator includes an aerosol suction pump generating a negative pressure in the virtual impactor stages and a circulating-flow channel in which a part of the separated aerosol with fine particles is returned in the circulating flow from the aerosol outlet to the aerosol inlet of the aerosol suction pump. The present invention also relates to a method for investigating concentrated, larger aerosol particles of an aerosol.

18 Claims, 6 Drawing Sheets

(51) Int. Cl.
  *B01D 45/08* (2006.01)
  *G01N 15/14* (2006.01)
  *G01N 1/00* (2006.01)
  *G01N 15/00* (2006.01)

(52) U.S. Cl.
  CPC ... *G01N 15/1459* (2013.01); *G01N 2001/002* (2013.01); *G01N 2015/0019* (2013.01); *G01N 2015/0693* (2013.01)

(58) Field of Classification Search
  CPC .............. G01N 15/0261; G01N 15/02; G01N 21/6428; G01N 21/64; G01N 1/2208; G01N 1/24; G01N 1/22
  USPC .......... 356/335–343, 72, 301–326, 432–440; 73/863.21, 863.22, 865.5, 28.05, 28.01
  See application file for complete search history.

(56) References Cited

U.S. PATENT DOCUMENTS

| | | |
|---|---|---|
| 5,695,130 A | 12/1997 | Csendes |
| 8,104,362 B2 * | 1/2012 | McFarland ............ B01D 46/06 73/863.21 |
| 2002/0122177 A1 | 9/2002 | Sioutas |
| 2011/0203931 A1 | 8/2011 | Novosselov |
| 2013/0098142 A1 * | 4/2013 | Trimborn ................ G01N 1/40 73/28.01 |
| 2013/0248693 A1 | 9/2013 | Buchanan |

* cited by examiner

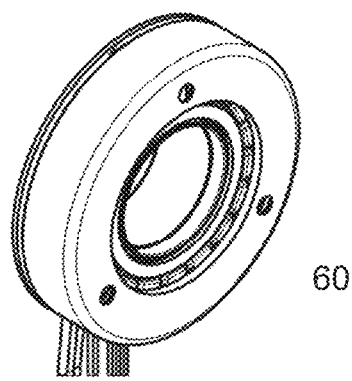
Fig. 4
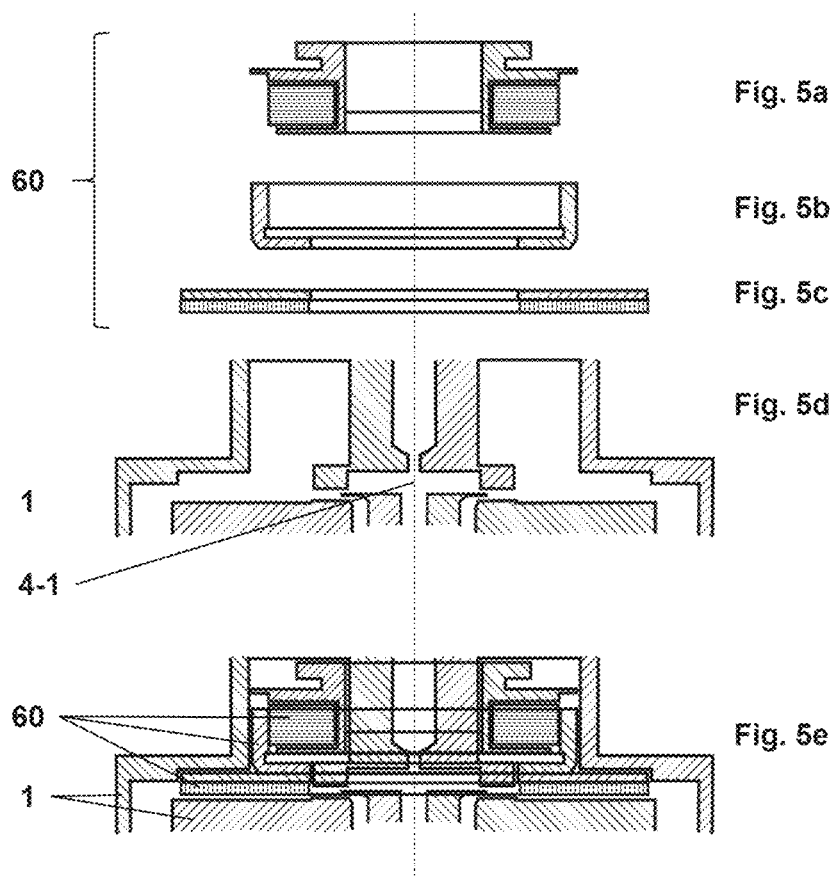
Fig. 5a
Fig. 5b
Fig. 5c
Fig. 5d
Fig. 5e

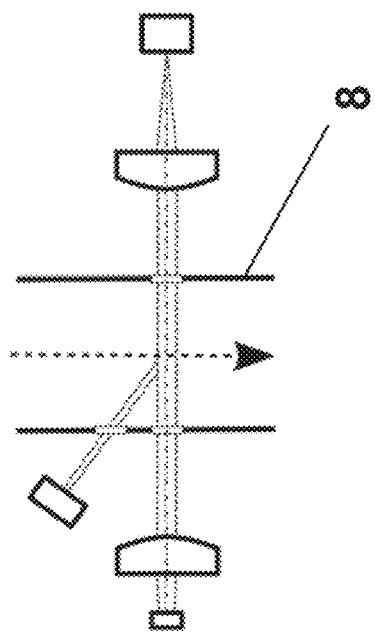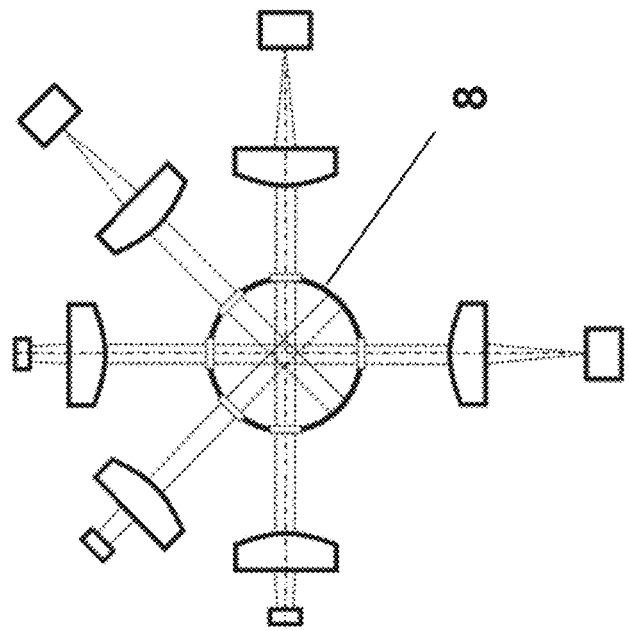

MEASURING SYSTEM FOR INVESTIGATING CONCENTRATED AEROSOL PARTICLES IN THE GAS PHASE

CROSS REFERENCE TO RELATED APPLICATION

This application is a national stage entry of PCT/EP2019/072764 filed Aug. 27, 2019, under the International Convention claiming priority over European Patent Application No. 18191098.5 filed Aug. 28, 2018.

FIELD OF THE INVENTION

The present invention relates to a measuring system and a method for investigating concentrated, larger aerosol particles (3) of an aerosol (2) in the gas phase as well as the use of the measuring system and the method.

BACKGROUND OF THE INVENTION

In our society, the occurrence of allergic rhinitis, also called pollen allergy or hay fever is increasing continuously and the number of those affected is increasing worldwide. In Switzerland at the present time, 15-20% of the population is considered to be allergic to pollen. This not only accounts for a substantial fraction of the health costs but also the economic costs should not be neglected.

In order to be able to provide those allergic to pollen in Europe with suitable information relating to pollen count, it must be possible to distinguish between 10 to 20 different types of pollen. In this context, it is very important that both a qualitative determination, i.e. the type of pollen and also a quantitative determination, i.e. the number of pollen particles per unit volume and the pollen concentration of the pollen can be carried out reliably.

An older but still very frequently used method for measuring pollen is based on Hirst pollen traps. In these, adhesive strips are mounted to which the pollen located in the air adheres. The pollen thus collected, adhering to the strips is then investigated periodically in the laboratory by a trained specialist, for example, manually by means of light microscopy and then identified. The results of the qualitative and quantitative pollen determination are therefore usually available only with a time delay of several days. In addition, the effort is usually considerable and costly although a measurement uncertainty of up to 25% is assumed.

Thus, for example, in Switzerland as a result of the presently available measurement methods the pollen data is only available with a delay of about one week despite a not insignificant inaccuracy. In addition, the geographical resolution is very low since at the present time there are only 14 measuring stations in Switzerland.

Recently, various measuring systems have been proposed for more rapid determination of pollen. In this case, the measurement of the fluorescence of the materials to be investigated is proposed as a suitable method.

In addition, pollen in the ambient air is frequently very diluted which makes it difficult to determine the pollen. This is because in particular for a quantitative pollen determination, at low pollen concentrations a very large amount of air must be investigated over a very long-time interval, for example, several hours per day, to obtain a meaningful amount of data. However, such long measurement times are not only not practical but also in some cases cannot be carried out at all, for example, on account of variable pollen count. This is in clear contrast with the expectation of providers of pollen count reports that even the smallest quantities of pollen of, for example, only 10 pollens per $m^3$ of air and per pollen type can be determined correctly qualitatively and quantitatively in less than 1 hour. A short measurement time is also important for a good early warning for persons allergic to pollen, in particular when the pollen concentrations has exceeded a threshold value, i.e. a defined concentration.

EP-A-1109005 discloses a counting method for pollen grains and a pollen counting apparatus comprising the separation of particles contained in a specific atmospheric quantity with the exception of particles which are substantially smaller than pollen grains and causing the separated particles to flow through a flow cell in such a state that the self-fluorescence of each particle can be measured. In this case, the number of particle grains to be measured in the aerosol remains unchanged wherein the air volume flow becomes smaller and as a result the concentration is increased. However, it is not possible to distinguish sufficiently well between 10 to 20 different types of pollen necessary in Europe using the proposed method. The separation of the pollen grains before the measurement can additionally result in an undesired impairment of the pollen grains. The pollen to be measured are certainly concentrated by a factor of 15 which, however, is clearly too low to be able to obtain reliable qualitative and quantitative information on pollen even with the smallest amounts of pollen within a useful term. As a result, for example, not only the beginning of the pollen count cannot be identified in sufficiently good time but amounts of pollen can only be determined for a concentration which is clearly too high for the allergic person.

SUMMARY OF THE INVENTION

Thus, it is the object of the present invention to provide a measuring system by means of which a plurality of most diverse aerosol particles such as pollen can be determined qualitatively and/or quantitatively within a short time and with a high certainty even with extremely small quantities of pollen in order, for example, to correctly inform the person allergic to pollen shortly after the first pollen count. The measuring device should be compact, robust and inexpensive so that it can be used versatilely and ideally flexibly, i.e. in changing locations. In addition, it should be possible to remove a larger part of the fine particles not relevant to the measurement before the measurement inter alia to avoid possible interfering factors.

This object could surprisingly be solved using a measuring system (7) having a measuring-system inlet (71) and measuring-system outlet (72) for investigating concentrated, larger aerosol particles (3) of an aerosol (2) in the gas phase comprising a multi-stage aerosol particle concentrator (1) for separating most of the fine particles (21) and a part of the gas phase of the aerosol (2), as well as a measuring chamber (8) for analyzing the larger aerosol particles (3), wherein:

i) the measuring chamber (8) comprises a measuring device (80) for the qualitative and/or quantitative determination of the aerosol particles (3), in particular in real time, and ii) the aerosol particle concentrator (1) comprises a first (4-1) and at least one last (4-x) virtual impactor stage (4) each having a sample inlet (41), a side outlet (42) and sample outlet (43), wherein the virtual impactor stages (4) separate a larger part of the aerosol (2) with fine particles (21) and concentrate the larger aerosol particles (3) in the smaller part of the aerosol (2), wherein the aerosol particle concentrator (1);

comprises an aerosol suction pump (6) having an aerosol inlet (61) and aerosol outlet (62) for generating a negative pressure in the virtual impactor stages (4), wherein the side outlet (42) of the first virtual impactor stage (4-1) is connected to the aerosol inlet (61) as well as a circulating-flow channel (64) in which a part of the separated aerosol with fine particles (21) is returned in the circulating flow from the aerosol outlet (62) to the aerosol inlet (61) of the aerosol suction pump (6), wherein the side outlet (42) of at least one further (4-2) and/or of the last (4-x) virtual impactor stage (4) is connected to the circulating-flow channel (64).

Also claimed is a method for investigating concentrated larger aerosol particles (3) of an aerosol (2) using a measuring system (7) according to the invention, wherein:

with the aerosol particle concentrator (1) the larger volume fraction of the aerosol (2) at normal pressure with the fine particles (21) is separated off via the side outlet (42) of the virtual impactor stages (4, 4-1, 4-x) and optionally at least one further virtual impactor stage (4, 4-2), wherein the side outlet (42) of the at least one further (4-2) and/or of the last (4-x) virtual impactor stage (4) is connected to the circulating flow channel (64), the larger aerosol particles (3) are concentrated in the smaller part of the aerosol (2) and are guided through the sample outlet (43) of the first virtual impactor stage (4, 4-1), optionally via at least one further virtual impactor stage (4-2) to the last virtual impactor stage (4-x) and then to the measuring chamber (8); and the larger aerosol particles (3) in the measuring chamber (8) are investigated using the measuring device (80) for the qualitative and/or quantitative determination of the aerosol particles (3) in the gas phase and preferably in real time.

In addition, the use of the measuring system (7) according to the invention and the method according to the invention to investigate aerosols (2), in particular concentrated aerosol particles (3) of the aerosols (2) in the gas phase and preferably in real time.

BRIEF DESCRIPTION OF THE DRAWINGS

FIG. 4 shows as an example a radial fan with axial passage in the form of an external rotor motor with hollow shaft;

FIG. 5 shows as an example the installation of the radial fan in the multi-stage aerosol particle concentrator in the region of the first virtual impactor stage;

FIG. 5a shows the cross-section of the stator of the radial fan;

FIG. 5b shows the cross-section of the rotor of the radial fan;

FIG. 5c shows the cross-section of the turbine wheel of the radial fan which is mounted on the rotor of the external rotor motor;

FIG. 5d shows the cross-section of the multi-stage aerosol particle concentrator in the region of the first virtual impactor stage in which the radial fan is installed;

FIG. 5e shows the cross-section of the radial fan with stator, rotor and turbine wheel installed in the region of the first virtual impactor stage of the multi-stage aerosol particle concentrator;

FIGS. 8a-8b show the measuring chamber with a device for digital holography measurement shown as an example as measuring device for the qualitative and/or quantitative determination of the aerosol particles in real time and in flight;

FIG. 8a shows the optical setup for the holography measurement from the side;

FIG. 8b shows a cross-section through the circularly depicted measuring chamber and through the measuring device;

DETAILED DESCRIPTION OF THE INVENTION

Figure 1:
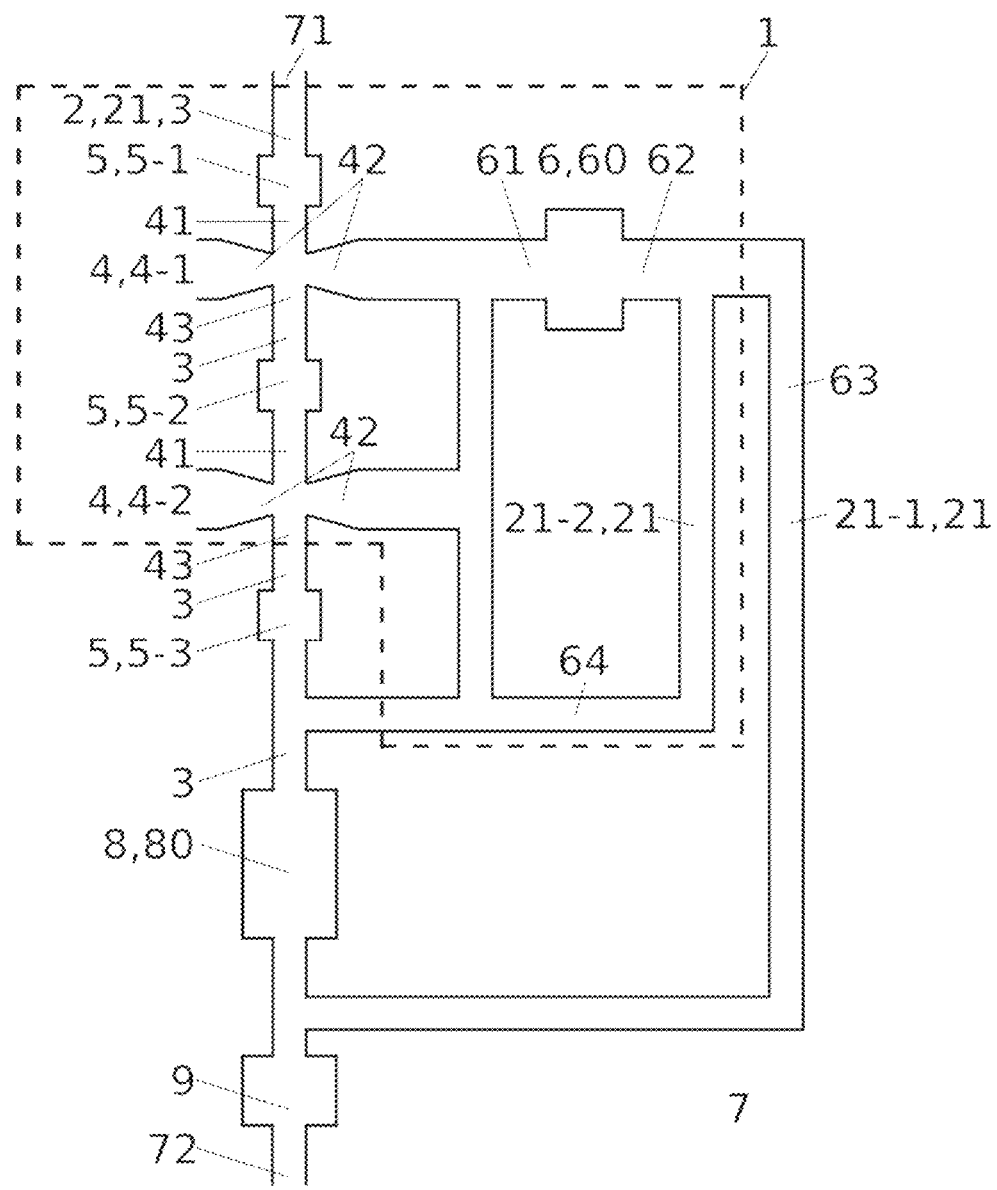
FIG. 1 shows as an example and schematically a part of the measuring system according to the invention.

It was surprisingly found that as a result of the measuring system (7) according to the invention, the method according to the invention and the use according to the invention, this demanding task can be satisfied. This is because as a result of the aerosol particle concentrator (1), a larger part of the aerosol (2) with fine particles (21) is separated and the larger aerosol particles are concentrated in the smaller part of the aerosol (2). Thus, it is possible, for example, to concentrate the larger aerosol particles (3) to be investigated by a factor of up to 1000 or more. As a result, the larger aerosol particles (3) of a substantially larger gas volume can be analyzed, i.e. investigated, in a much smaller measuring chamber (8) of the measuring system (7) in the smallest area using the measuring device (80) both qualitatively and quantitatively rapidly and in flight, i.e. in the gas phase, and therefore in real time. In addition, the fraction of the fine particles (21) located originally in the aerosol (2) is drastically reduced or completely removed so that at most only a very small fraction of fine particles (21), which is insignificant for the measurement of the larger aerosol particles, together with the larger aerosol particles (3), enters into the measuring chamber (8). Thus, relevant qualitative information on pollen can be provided to allergic persons within minutes and quantitative information can be provided with high precision, for example, within less than one hour.

The aerosol particle concentrator (1) comprises a circulating-flow channel (64) in which a part of the separated aerosol with fine particles (21) is returned in the circulating flow from the aerosol outlet (62) to the aerosol inlet (61) of the aerosol suction pump (6). Thus, by means of the aerosol particle concentrator (1), i.e. aerosol particle concentrator (1) having a plurality of, i.e. at least two, virtual impactor stages (4), a substantially smaller volume flow in which the larger aerosol particles (3) are concentrated can be separated from a larger intake volume flow of the aerosol (2). As a result, for example, a volume flow of 40 l/min can be reduced by means of three concentration stages, i.e. by means of three virtual impactor stages (4) by a factor of 1000 and therefore to merely 0.04 l/min. This small volume flow comprising the aerosol particles (3) concentrated therein is investigated in the measuring chamber by means of the at least one measuring device (80). This surprisingly allows a reliable quantitative determination even of the smallest amounts of pollen, for example, of only 10 pollen particles per $m^3$ of air, within 1 hour or less. Without the circulating-flow channel (64) used in the aerosol particle concentrator (1) according to the invention, it is not possible to concentrate the larger aerosol particles (3) so substantially and to qualitatively and quantitatively determine a very low pollen particle concentration within such a short time. It is noted that the determination of the aerosol particles (3) is preferably measured in real time, wherein an accumulated measuring time—during which a plurality of pollens is determined in real time—of, for example, one hour, is required for the quantitative determination of the pollen concentration.

The operating mode of the circulating-flow channel (64) used according to the invention is understood as follows: the aerosol suction pump (6) generates a negative pressure in the area of the aerosol inlet (61) in order to suck in aerosol (2). This exits again—at least partially—through the aerosol outlet (62). A part thereof is guided in the circulating-flow channel (64) back to the aerosol inlet (61), wherein the circulating-flow channel (64) is initially guided in a first portion in the direction of the measuring chamber (8) and then diverted in a second portion in the direction of the aerosol inlet (61). In this case, the second portion is arranged between the—typically centrally arranged—connecting channel (5) with the larger aerosol particles (3) and the first portion of the circulating-flow channel (64). The side outlets (42) of the further (4-2) virtual impactor stages (4) are connected to the second portion of the circulating-flow channel (64) which leads of the aerosol inlet (61) of the aerosol suction pump (6). The negative pressure in the region of the aerosol inlet (61) is now advantageously adjusted so that the other part of the aerosol with fine particles (21-2) guided in the circulating-flow channel (64) is not only sucked in by this negative pressure but also so that in those places where the side outlets (42) of the further (4-2) virtual impactor stages (4) are connected to the second portion of the circulating-flow channel (64), a lower pressure prevails than within the further or last virtual impactor stage (4-2, 4-x). This is because as a result, the aerosol suction pump (6) also serves as a suction pump of the further or last virtual impactor stage (4-2, 4-x). This arrangement surprisingly allows the intake of gas and optionally of aerosols with fine particles (21-1) through side outlets (42) of virtual impactor stages (4) having very small dimensions, in particular of further virtual impactor stages (4-2) as well as the last virtual impactor stage (4-x). Thus, as a result of the flow within the circulating-flow channel (64), the gas fractions flowing out at the side outlets (42) which can optionally contain further fine particles (21) are suctioned off and conveyed to the aerosol inlet (61). As a result, the larger aerosol particles (3) in the further and the last virtual impactor stages (4-2, 4-x) are efficiently further concentrated without an additional air suction pump.

Without the circulating-flow channel (64), it is not possible in particular to carry out a quantitative pollen determination even of the smallest pollen concentrations within, for example, an hour or less. This is because without the circulating-flow channel (64), in a measuring system (7) for investigating larger aerosol particles (3) of an aerosol (2) in the gas phase, the side outlets (42) of the further virtual impactor stages (4-x) of the multistage aerosol particle concentrator (1) are dimensioned so thinly that they could not be produced—or at least not within the required tolerance. In addition, the risk of deposits by fine particles (21) and therefore of a blockage of the side outlets (42) increases. In other words, a volume flow at the measuring system inlet (71) of, for example, 40 μmin could not be concentrated by a factor of 1000 without circulating-flow channel (64). The consequence thereof would, inter alia, be a lower concentration factor and therefore at low pollen concentrations a substantially higher required measurement time, i.e. observation time in order to obtain quantitative information on the pollen count, i.e. in order to test a statistically significant random sample for the larger aerosol particles (3). However, if the aerosol particle concentrator (1) is equipped with the circulating-flow channel (64), the side outlets (42) can have larger dimensions since in addition to the aerosol fraction which is separated by means of impactor stages (4-2, 4-x), the other part of the aerosol with fine particles (21-2) is guided back to the aerosol inlet (61). Thus, the presence of the circulating-flow channel (64) surprisingly allows the sucked-in aerosol (2)—and therefore the larger aerosol particles (3) to be investigated in the aerosol (2)—to be concentrated by a substantially larger factor. This in turn makes possible in particular a quantitative determination of larger aerosol particles (3) within a short measurement time even if they are present in extremely small concentrations in the aerosol (2) to be investigated.

Surprisingly, any larger aerosol particles (3) can be investigated using the measuring system (7) according to the invention comprising the measuring chamber (8) with the at least one measuring device (80). As a result of the possible different measuring devices (80) which can be used, the aerosol particles need not satisfy any requirements with regard to their chemical composition. The minimal size of the aerosol particles (3) can be adapted to the requirements by means of adaptation of the virtual impactor stages (4).

In addition, the measuring system (7) is robust, rapid, efficient and usually can also be used at usually available operating voltage, with the result that it is also suitable outdoors and/or as a mobile measuring device. In addition, it is cost-effective and can be built with small dimensions. Thus, for example, the measuring chamber (8) can be built with external dimensions of about $10 \times 5 \times 5$ $cm^3$ and the measuring system (7) can be built with external dimensions of about $30 \times 30 \times 30$ $cm^3$, with the result that it gains additional attractiveness. As a result, significantly more pollen measuring stations can be built without appreciable effort and at reasonable costs and the degree of automation of the pollen determination can be significantly increased, which leads to a denser pollen count data network and therefore to a better spatial resolution. Thus, much more exact information on the daily current pollen count is provided substantially more rapidly to people allergic to pollen which in turn enhances the quality of life of those allergic to pollen and reduces the economic costs Thus, the measuring system (7) according to the invention can be used extremely flexibly. Also, very rapidly moving particles such as aerosol particles of aerosols, in particular a plurality—for example, 20 or more—of different pollens and spores can be investigated quantitatively and qualitatively in real time and even in flight and can be distinguished from one another, which had not been possible up till now.

EP-A-2 679 985 discloses a device for real-time fluorescence detection with a particle concentrator for separating and concentrating the aerosol particles and a particle measuring unit arranged on the underside of the particle concentrator. The particle measuring unit comprises: an inlet part which is adapted to guide the particles and air from the particle concentrator into the particle measuring unit; an optical chamber with a particle measuring space formed in the interior thereof; a beam forming part which is adapted to illuminate the particles in the measuring space using a laser beam; a beam delivery part; reflectors arranged in the particle measuring space at an angle of 90° in relation to the forward direction of the laser beam; a particle ejecting part which is adapted to eject the particles and air outwards; and a beam splitter with a scattered light detector and fluorescence detectors which are adapted to detected scattered light and fluorescence light produced by the interaction between the laser beam and the particles. A circulating-flow channel in which a part of the separated aerosol with fine particles is returned in the circulating flow from the aerosol outlet to the aerosol inlet of the same aerosol suction pump is not mentioned.

U.S. Pat. No. 4,968,885 describes a method and a device for introducing liquid samples into chemical detectors in which the liquid samples are converted either into a gaseous or into a particulate state. The enriched dissolved particles are vaporized, ionized and/or detected by suitable gas-phase or particle detectors. The device is primarily an interface between a liquid chromatograph or process flows and the mass spectrometer. Thus, no measuring device comprising an aerosol particle concentrator in the sense of the present invention is described. Also there is no mention of a circulating-flow channel in which a part of the separated aerosol with fine particles is returned in the circulating flow from the aerosol outlet to the aerosol inlet of the same aerosol suction pump.

US-A-2011/0203931 discloses devices, apparatus and methods for the non-contact pneumatic sampling and sampling of surfaces, persons, articles of clothing, buildings, furnishings, vehicles, baggage, packages, post and the like, for investigating the contamination by aerosols or vapours indicative of a hazard, where the contaminating aerosols or vapours are chemical, radiological, biological, toxic, or infectious in character. In a first device, a central orifice for pulling a suction gas stream is surrounded by a peripheral array of convergingly-directed gas jets, forming a virtual sampling chamber. The gas jets are configured to deliver millisecond pneumatic pulses which remove particles and vapours from solid surfaces at a distance. In another aspect of the invention, a suction gas stream is split using an air-to-air concentrator so that a particle-enriched gas flow is directed to a particle trap and particles immobilized therein are selectively analyzed for explosives and explosives-related materials under optimization. The conditions for the analysis of particle-associated constituents and a mass flow are directed to a vapour trap and free vapours immobilized therein are selectively analyzed for explosives and explosives-related materials under optimized conditions for the analysis of free vapours. Detection signals from the particle channel and the vapour channel are compared or integrated to detect trace residues associated with explosives. Thus, no measuring device comprising an aerosol particle concentrator in the sense of the present invention is described. Also there is no mention of a circulating-flow channel in which a part of the separated aerosol with fine particles is returned in the circulating flow from the aerosol outlet to the aerosol inlet of the same aerosol suction pump.

The Measuring System (7)

The measuring system (7) according to the invention is suitable for investigating, i.e. analyzing concentrated larger aerosol particles (3) of an aerosol (2) in the gas phase. The measuring system (7) comprises a measuring system inlet (71) typically arranged in the upper area of the measuring system (7) and a measuring system outlet (72) typically arranged in the lower region of the measuring system (7). The aerosol (2) passes through the measuring system inlet (71) into the measuring system (7). In a first part of the measuring system (7) at least a large part of the smaller fine particles (21) with the larger volume fraction of the aerosol are separated from the larger aerosol particles (3) in a smaller volume fraction of the aerosol by means of a multi-stage aerosol particle concentrator (1). The aerosol particles (3) concentrated in the smaller volume fraction of the aerosol are then guided through the measuring chamber (8) and investigated using the at least one measuring device (80). The aerosol particles (3) then leave the measuring system (7) through the measuring system outlet (72). Thus, the aerosol particles (3) are not separated for the analysis but remain in the gas phase during the entire time. The measurement of the aerosol particles (3) is thus made in flight and in fractions of a second. It is possible and preferable to evaluate the measurement data in real time.

In this case, according to the present invention real time is understood to mean that the measurement can be carried out immediately and therefore in a fraction of a second, for example during a few nano-, micro- or milliseconds. The subsequent evaluation of the data obtained typically takes seconds up to a few hours depending on the amount of data obtained and computer power. Thus, materials (2) can be determined which can only be analyzed during an extremely short time.

The measuring system (7) thus comprises a multistage aerosol particle concentrator (1) for separating fine particles (21) and a larger part of the gas phase of the aerosol (2) as well as for concentrating the larger aerosol particles (3) in a smaller part of the gas phase. In addition, the measuring system (7) comprises a measuring chamber (8) with at least one measuring device (80) for the qualitative and/or quantitative determination, i.e. analysis of the concentrated larger aerosol particles (3), in particular in real time.

The measuring system (7) quite particularly preferably has a cylindrical design. In this case, the virtual impactor stages (4, 4-1, 4-2, 4-x), the connecting channels (5, 5-1, 5-2, 5-3) and the measuring chamber (8) are arranged in series, advantageously linearly and in the centre of the cylindrical design. The regions which, for example, are completely enclosed by the circulating-flow channel (64) and by the residual aerosol channel (63) are held at points by fine connecting elements in order to give the necessary stability to the measuring system (7) with circulating-flow channel (64).

The measuring system (7) advantageously comprises at least one flow regulating valve in order to regulate the aerosol flow and optionally the negative pressure in the aerosol particle concentrator (1) and/or in the aerosol suction pump (6). The at least one flow regulating valve can, for example, be mounted at the aerosol outlet (62) of the aerosol suction pump (6), in the residual aerosol channel (3) and/or in the circulating-flow channel (64). Suitable flow regulating valves are known to the person skilled in the art.

The Aerosol Particle Concentrator (1)'

The aerosol particle concentrator (1) comprises at least one first (4-1) and at least one last (4-x) virtual impactor stage (4) each having a sample inlet (41), side outlet (42) and sample outlet (43), wherein the virtual impactor stages (4) separate a larger part of the aerosol (2) with fine particles and concentrate the larger aerosol particles (3) in the smaller part of the aerosol (2). This allows more rapid measurements since a larger number of aerosol particles can be investigated per unit time and therefore provide more measured values per unit time. Thus, even small particle concentrations can be determined in a short time and/or with high accuracy.

The aerosol particle concentrator (1) of the present invention is a multi-stage aerosol particle concentrator (1), i.e. it comprises a plurality of the same or similar, in particular at least two virtual impactor stages (4) in order to concentrate the aerosol particles (3) in several steps in a part of the aerosol (2).

Virtual impactor stages (4) are familiar to the person skilled in the art. They typically comprise two parallel plates which are arranged at an angle of 90° with respect to the direction of flow of the aerosol and which each have an opening in the centre of the plates. Located in the centre of the upper plate is a nozzle, i.e. a tapering through which the aerosol flows and in which the aerosol is accelerated. As a result of the geometry of the virtual impactor stage (4), the larger part of the aerosol (2) with fine particles (21) is separated between the plates and led off laterally. The smaller part of the aerosol (2) flows together with the larger aerosol particles (3) through the opening of the lower plate.

The multi-stage aerosol particle concentrator (1) comprises at least two virtual impactor stages (4), i.e. a first virtual impactor stage (4-1), optionally at least one further virtual impactor stage (4-2) and a last virtual impactor stage (4-x). In this case, the impactor stages (4) are preferably connected to the connecting channels (5). In this case, the measuring system inlet (71), the virtual impactor stages (4), the connecting channels (5) and the measuring chamber (8) are advantageously arranged linearly and therefore in a series, in particular also vertically. In this case, the measuring system inlet (71) is typically located at the uppermost point of this arrangement with the result that the larger aerosol particles (3) are also conveyed with the aid of gravity from the measuring system inlet (71) in the direction of the measuring chamber (8).

The virtual impactor stages (4) of the measuring system (7) according to the invention and the method according to the invention are typically defined by means of the Stokes number, wherein advantageously the following conditions are satisfied:

$$(St)^{1/2} \geq 0.4 \quad (1)$$

wherein $$St = (d_p^2 \cdot C \cdot u_j \cdot p_p)/(9 \cdot I \cdot \mu) \quad (2)$$

and St=Stokes number [-],
$d_p$=cut-off diameter of the aerosol particles (3) to be concentrated [m],
C=Cunningham factor [-]
$u_j$=mean jet speed [m/s]
$\rho_p$=density of the particles [kg/m³]
I=nozzle diameter [m] of the sample inlet
µ=dynamic fluid viscosity [Pa·s].

Cut-off diameter $d_p$ is understood as the diameter of that aerosol particle which as the smallest of the larger aerosol particles (3) should not be separated with the smaller part of the aerosol (2). If pollen having an average diameter of about 20 µm or larger is to be measured, a cut-off diameter of, for example, 10 µm is preferably reckoned on in Equation (2).

The Cunningham factor C is a dimensionless, material-specific characteristic. In order to calculate the Stokes number according to Equations (1) and (2), a Cunningham factor of 1 is used according to the invention and to a good approximation.

The mean jet speed $u_j$ is obtained from the nozzle diameter and the volume flow.

The density of the aerosol particles to be separated can be used as the density of the particles $\rho_p$. For pollen the density can lie in the range of 500 kg/m³ to 1200 kg/m³. If no information is available on the density, the Stokes number according to the invention is calculated with a particle density of 600 kg/m³.

The nozzle diameter I of the sample inlet (41) can be varied depending on the system. Frequently a nozzle diameter for the last impactor stage (4-x) of, for example, 1.5 mm is suitable for investigating pollen.

The dynamic fluid viscosity of air having a density of 1.185 kg/m3 at 25° C. is used as dynamic fluid viscosity µ. In this case, according to the invention in order to calculate the Stokes number the air is considered to be incompressible and therefore a value of 1.831e-5 Pa·s is used.

The aerosol particle concentrator (1) of the measuring device (7) according to the invention and the method according to the invention preferably comprises at least two virtual impactor stages (4) arranged in series each having a sample inlet (41), side outlet (42) and sample outlet (43) as well as at least three connecting channels (5) separated from one another by the impactor stages (4).

The aerosol particle concentrator (1) of the present invention additionally comprises an aerosol suction pump (6) with aerosol inlet (61) and aerosol outlet (62) for producing a negative pressure in the virtual impactor stages (4), wherein the side outlet (42) of the first virtual impactor stage (4-1) is connected to the aerosol inlet (61), as well as a circulating-flow channel (64) in which a part of the separated aerosol with fine particles (21) is returned in the circulating flow from the aerosol outlet (62) to the aerosol inlet (61) of the aerosol suction pump (6), wherein the side outlet (42) is connected [to] at least one further (4-2) and/or the last (4-x) impactor stage (4). The aerosol suction pump (6) is typically a gas or air suction pump which is also suitable for sucking in aerosols.

In a preferred embodiment of the measuring system (7), the aerosol suction pump (6) is a radial fan (60) or a static pressure distributing arrangement (65) with air pump (66), wherein an aerosol intake opening, i.e. the aerosol inlet of aerosol suction pump (61), is arranged in the centre of the radial fan (60) or in the centre of the static pressure distribution arrangement (65) and/or the measuring system (1) comprises a further aerosol suction pump (9) which is arranged between the measuring chamber (8) and the measuring system outlet (72).

The terms "in the centre of the radial fan (60)" and "in the centre of the static pressure distributing arrangement (65)", are understood in this case to be the central region of the cross-section of the radial fan (60) or the static pressure distributing arrangement (65) measured at right angles to the direction of flight of the larger aerosol particles (3).

Radial fan (60) is understood according to the invention as a fan which sucks in the air—and therefore the aerosol (2)—which enters into the measuring device (7) parallel to the drive axis of the fan through the measuring system inlet (71) and through the rotation of the radial impeller, blows out the larger fraction of the aerosol (2) together with the fine particles (21) deflected by 90° and radially, i.e. laterally. In this case, the fan blades of the radial fan (60) are arranged between the sample inlet (41) and the side outlet (42) or only in the side outlet (42) of the first impactor stage (4-1). In this case, the aerosol suction opening is preferably arranged in the centre of the radial fan (60). Advantageously the radial fan (60) used according to the invention is combined with the first virtual impactor stage (4), whereby the side outlet (42) of the virtual impactor stage (4) and the one end of the circulating-flow channel (64) correspond to the aerosol suction opening of the radial fan (60) and therefore also to the aerosol inlet (61) of the aerosol suction pump (6), i.e. to the radial fan (60). In addition, the radial fan (60) advantageously comprises an external rotor motor with hollow shaft or an external drive connected, for example, via pinions or belts. In a preferred embodiment the radial fan (60) is a radial fan with axial passage.

Static pressure distributing arrangement (65) is understood as a typically round, disk-like and static arrangement through which the larger part of the aerosol (2) with fine particles (21)—coming from the measuring system inlet (71) of the measuring device (7)—flows. The pressure distributing arrangement (65) is preferably arranged around the aerosol inlet (61) of the aerosol suction pump (6), i.e. the pressure distributing arrangement (65) with air pump (66) and comprises a first region adjoining the aerosol inlet (61). Located in this first region is the suction opening of the air pump (66) as well as optionally, in particular preferably at least one device to distribute the negative pressure generated by the air pump (66) as uniformly as possible. Such a device comprises, for example, walls having a plurality of openings (65a). The negative pressure generated by the air suction pump (66) sucks in a part of the aerosol (2) with fine particles (21) and guides this through the aerosol return inlet (66b) into a second region which is separate from the first region by a wall without openings (65b). The second region comprises at least one aerosol outlet (62) through which the aerosol (63) together with the fine particles (21) is guided to the residual aerosol channel (63) and at least one, preferably a plurality of, openings (65c) to the circulating-flow channel (64). In this case, advantageously the aerosol return inlet (66b), the aerosol outlet (62) and the at least one opening (65c) with at least one device are separated from one another in order to optimally distribute the pressure differences produced by the various inlet/outlets of the aerosol (2) with fine particles (21). In this case, the second region can laterally enclose the first region and/or for example, be arranged below the first region. The pressure distributing arrangement (65) is advantageously also delimited towards the outside by a wall (65b) without openings.

The aerosol (2) with the fine particles (21) is therefore deflected from the measuring system inlet (71) as a result of the suction effect of the air pump (66) in the first virtual impactor stage (4-1) by 90° and suctioned through the side outlet (42) of the virtual impactor stage (4-1) into the aerosol inlet (61) of the pressure distributing arrangement (65). Through the suction opening (66a) of the air pump (66), the deflected part of the aerosol (2) with fine particles (21) is suctioned from the first region of the pressure distributing arrangement (65) to the air pump (66) and from there again is pressed—by means of gas outlet pressure—through the aerosol return inlet (66b) into the second region of the pressure distributing arrangement (65). From there a part of the aerosol with fine particles (21-1) passes through the aerosol outlet (62) into the residual aerosol channel (63). The other part of the aerosol with fine particles (21-2) passes via the at least one opening (65c) into the circulating-flow channel (64) and from there back again to the aerosol inlet (61).

The cross-section of the radial fan (60) and/or the pressure distributing arrangement (65) can—measured at right angles to the direction of flight of the larger aerosol particles (3), for example, have a cross-section which is comparable with that of the measuring system (7), wherein the cross-section of the radial fan (60) or the pressure distributing arrangement (65) can also be smaller. The height of the radial fan (60) and/or the pressure distributing arrangement (65)—measured in the direction of flight of the larger aerosol particles (3)—can, for example, be between 0.5 cm and 20 cm or more.

The air pump (66) connected to the static pressure distributing arrangement (65) sucks in the larger part of the aerosol (2) with fine particles (21) and conveys it—at least in part—back again into the pressure distributing arrangement (65). As a result, the operating mode of the virtual impactor stages (4) is made possible if a static pressure distributing arrangement (65) is provided. The air pumps (65) are gas pumps and generate a pressure difference wherein the lower pressure, i.e. a negative pressure relative to the external pressure is arranged on the side of the first virtual impactor stage.

Circulating-flow channel (64) is understood according to the invention to means that a part of the larger part of the aerosol (2) with fine particles (21) is guided in the circuit. In so doing, the circulating-flow channel (64) returns a part of the sucked-in aerosol with aerosol fine particles (21) from the aerosol outlet (62) in the circulating flow to the aerosol inlet (61) of the aerosol suction pump (6). In this case, the side outlets (42) of the further (4-2) and the last (4-x) virtual impactor stage (4) are connected to the circulating-flow channel (64). As a result of the flow inside the circulating-flow channel (64), the gas fractions flowing out at the side outlets (42) which can optionally contain further fine particles (21) are suctioned off and conveyed to the aerosol inlet (61).

If the measuring system (7) comprises a static pressure distributing arrangement (65) with air pump (66) and a further aerosol suction pump (9), the air pump (66) and the aerosol suction pump (9) can be structurally the same.

In a preferred embodiment the aerosol outlet (62) of the aerosol suction pump (6) is connected both a) to a residual aerosol channel (63) which removes a part (21-1) of the sucked-in aerosol with aerosol fine particles (21) and also to b) a circulating-flow channel (64), wherein the circulating-flow channel (64) returns the other part (21-2) of the sucked-in aerosol with aerosol fine particles (21) in the circulating flow to the aerosol inlet (61) of the aerosol suction pump (6).

This arrangement enables an efficient guidance of the circulating flow in the circulating-flow channel (64) wherein also at the side outlets (42) of the further virtual impactor stages (4-2, 4-x), a negative pressure is produced in order to be able to efficiently remove the aerosol faction of the side outlets (42). In addition, a part (21-1) of the sucked-in aerosol with aerosol fine particles (21) is led off continuously.

In another preferred embodiment of the measuring system (7) according to the invention and the method according to the invention, a sheath flow is supplied to the sample outlet (43) of the last virtual impactor stage (4-x) in the aerosol flow direction, wherein the sheath flow i) forms a part branched off from the circulating flow channel (64) of the same. This allows an even better focussing—and therefore analysis—of the larger aerosol particles (3) in the concentrated smaller part of the aerosol (2) in the centre of the measuring chamber (8). In this case, the fine particles (21) supplied with the sheath flow surprisingly show no interfering effect in the measurement of the larger aerosol particles (3).

Frequently, it is also advantageous if the residual aerosol channel (63) is combined with the sample outlet of the measuring chamber (8) after the measuring chamber (8), with the result that the one part (21-1) of the aerosol with fine particles (21) combines with the aerosol particles (3) and the smaller volume fraction of the aerosol (2) at normal pressure and optionally are conveyed from the measuring system via the further aerosol suction pump (9). Thus, if required, all the particles, i.e. all the fine particles (21) and all the larger aerosol particles (3) can be conveyed from the measuring system (7) from a common opening.

The Aerosol (2) with Fine Particles (21) and the Larger Aerosol Particles (3)

The term aerosol (2) is understood according to the invention as a mixture of aerosol particles, also called suspended particles, in a gas or gas mixture, wherein the suspended particles are present at ambient temperature in solid and/or liquid form and typically have a mean diameter of about 20 µm to about 100 µm or more. Air is a typical gas mixture in aerosols which have everyday importance and can frequently constitute a health impairment or even pollution. The aerosol (2) is the aerosol before it is separated by the aerosol particle concentrator (1).

Aerosols comprise in a defined gas volume a plurality of aerosol particles which differ substantially in their size, shape and type. Thus, the aerosol (2) comprises larger aerosol particles (3) and fine particles (21), wherein the larger aerosol particles (3) have a larger mean diameter relative to the fine particles (21). By specific matching of the impactor stages (4) the person skilled in the art can set which particle sizes are concentrated as larger aerosol particles (3) and are guided into the measuring chamber (8) and which particle sizes are separated as fine particles (21) with the larger part of the aerosol (2) at least for the most part.

The aerosol particle concentrator (1) now separates the aerosol (2) into a larger part of the aerosol (2) with fine particles (21) and a smaller part of the aerosol (2) with the larger aerosol particles (3) to be investigated. In other words: the aerosol (2) is separated into a larger volume fraction, i.e. larger than 98 vol. % and preferably 99.5 vol. % or greater, of the gas phase of the aerosol (2) together with the fine particles (21) and a residual smaller volume fraction, less than 2 vol. % and preferably 0.5 vol. % or smaller of the gas phase of the aerosol (2) together with the larger aerosol particles (3).

The larger aerosol particles (3) to be investigated exhibit no restrictions, for example, in relation to their chemical composition. They can be present in the form of a solid, a liquid, a dispersion, a suspension, a paste and/or in the form of particles dispersed in air, in particular bio-aerosol particles. The aerosol particles (3) can also be present in the form of conglomerates.

Non-limiting examples of suitable aerosol particles (3) to be investigated comprise pollen, in particular, blossom, grass, plant and tree pollen, spores such as mould spores, in particular *Aspergillus fumigatus, Alternaria alternata, Penicillum notatum* and *Cladosporium herbarum*, bacteria, excrements of house dust mites, allergens of pets, proteins, DNA, RNA, organisms, smoke, in particular cigarette smoke, combustion gas and flue gas, soot and oil fumes from internal combustion engines such as, for example, car exhausts, sulphur dioxide and/or ash such as volcanic ash.

In a preferred embodiment of the measuring system (7) according to the invention, the larger aerosol particles (3) have a particle diameter of at least 1 µm, preferably at least 5 µm, in particular at least 10 µm, measured by means of light diffraction in accordance with ISO13320:2009. In this case, the aerosol particle concentrator (1), in particular the virtual impactor stages (4) of the aerosol particle concentrator (1) is optimized in such a manner that aerosol particles (3) which are greater than the desired minimum particle diameter are not deposited. Fine particles (21), i.e. aerosol particles having a smaller particle size are separated in the aerosol particle concentrator (1), in particular by the virtual impactor stages (4) with the larger part of the aerosol (2) so that they are substantially not guided into the measuring chamber (8). The person skilled in the art knows how he must change the aerosol particle concentrator (1) and the virtual impactor stages (4) in order to optimally set the desired minimal particle diameter of the larger aerosol particles (3). For this purpose, he typically calculates the Stokes number using Equations (1) and (2).

The Measuring Chamber (8) and the Measuring Device (80)

The measuring system (7) according to the invention comprises the measuring chamber (8) with at least one measuring device (80) for the qualitative and/or quantitative determination of the aerosol particles (3), in particular in real time.

The measuring device (80) can be arranged inside and/or outside the measuring chamber (8). If the measuring device (80) is arranged outside the measuring chamber (8) and is based on optical measurement principles, the light can be guided into the measuring chamber (8) and out again, for example, by means of suitable windows.

The measuring chamber (8) typically connects the sample outlet (43) of the last virtual impactor stage (4-$x$) to the outlet of the aerosol (2), wherein a connecting channel (5) can optionally be arranged between the last virtual impactor stage (4-$x$) and the measuring chamber (8) and/or a further aerosol suction pump (6) can be arranged between the measuring chamber (8) and the aerosol outlet.

The measuring chamber (8) of the measuring system (7) typically has an elongate shape with constant cross-section. In this case, the larger aerosol particles (3) are guided along the centre of the cross-section. During the flight they are analyzed by means of the measuring device (80).

The measuring chamber can surprisingly have small dimensions, for example, 5×2×2 cm$^3$, wherein larger or smaller dimensions are also possible.

The larger aerosol particles (3) concentrated in the smaller part of the aerosol (2) are typically continuously guided through the measuring chamber (8) during the measurement time, where they are then—typically also continuously—investigated, i.e. measured or analyzed, in the gas phase and preferably in real time using the measuring device (80).

In a preferred embodiment, the measuring device (80) for analysis of the larger aerosol particles (3) constitutes at least one measuring device i) for fluorescence measurement (81), ii) for digital holography measurement (82), iii) for time-resolved scattered light measurement (83) and/or iv) for Raman and/or infrared spectroscopy (84). If several measuring devices (80) are used, these can be arbitrarily combined. The person skilled in the art knows which combination of the measuring devices (80) he needs for the analyses desired in each case.

If the aerosol particles (3) exhibit autofluorescence, which is the case with many aerosol particles (3) such as, for example, with pollen, a measuring device for fluorescence measurement (81) is suitable as measuring device (80). In this case, the larger aerosol particles (3) to be investigated are excited by means of light of suitable wavelength. The aerosol particles (3) absorb the light and emit this again partially. The emitted light is then detected using a detector. Both the fluorescence intensity and also the fluorescence lifetime are suitable for the fluorescence measurement. In this case, the fluorescence lifetime can be measured in the time domain and also in the frequency domain. The person skilled in the art is familiar with the individual fluorescence methods and he can make a suitable selection of the method and also of the device and the individual components. The measuring device for the fluorescence measurement (81) is particularly helpful for the measurement of bio-aerosols such as, for example, pollen and spores, flue gases and for the detection of biological weapons such as, for example, aerosolized bacteria which are harmful to health such as anthrax (anthrax pathogen).

A preferred method for the particle identification in real time of individual aerosol particles in flight by means of fluorescence measurement (81) is measurement of the fluorescence lifetime in the frequency domain. In this case, the light emitted by the light source is advantageously intensity-modulated. In particular, electronic photon detectors based on semiconductor technology are suitable as detector. A particularly preferred detector is a silicon photomultiplier (SiPM). A particularly suitable measuring device for this is disclosed in the European Patent Application having the application number EP17189312.

If the measuring device (80) is a measuring device for digital holography measurement (82), an optical setup according to the in-line or Gabor method is typically used. In this case, coherent light from a light source—optionally focused by lenses, is guided through windows on the wall of the measuring chamber (8) through the measuring chamber (8) to an oppositely located detector, wherein the lenses can also be used as windows. In the measuring chamber (8), the light impinges upon the aerosol particles of the aerosol to be investigated as they fly past, wherein a part of the light is diffracted at the aerosol particle (3). This light influenced by the aerosol particles (3) interferes with the coherent background light of the light source and is detected jointly by the opposite imaging detector. This delivers a hologram of the aerosol particle (3) to be investigated which results in an additional imaging characterization of the aerosol particles. In this case, the assembly for the digital holography measurement (82) can comprise one or more in-line arrangements. A separate detector, also called trigger receiver, can be used for initiating the recording of the imaging detector. A part of the light impinging upon the aerosol particles (3) is scattered and can be detected by the trigger receiver. The person skilled in the art is also familiar with other optical configurations for the triggering of the recording time of the imaging detector. The measuring device for the digital holography measurement (82) is particularly helpful for the analysis of aerosol particles and biological cells in flight. In addition, the flow rate can be determined by means of the holograms of individual particles in flight.

If the measuring device (80) is a measuring device for time-resolved scattered light measurement (83), light of a light source, so-called excitation light, is collimated, i.e. focused with a lens, and guided through a window parallel to the axis of the aerosol flow with larger aerosol particles into the measuring channel, with the result that the particles are illuminated by the exciting light beam over a fairly long distance in the measuring channel. The exciting light can also be guided through the side window or a lens in the measuring channel and a mirror in the measuring channel deflects the light by 90° contrary to or in the flight direction of the aerosol particles, with the result that the aerosol particles are illuminated by the exciting light beam as they fly past. In so doing, scattered light is produced, wherein a part of the scattered light emerges laterally from the measuring chamber through a further window in the wall of the measuring chamber (8). The window can optionally be configured so that it takes over the function of the collimating lens or the emergent scattered light is collimated with a lens and optionally, i.e. if supplemented by a polarization measurement, separated by means of polarization filters into light having vertical and horizontal polarization, wherein a polarized light beam is deflected by 90°. The two polarized light beams are focused onto respectively one receiver by means of a further lens and detected. As a result, for each polarization of the light, scattered light intensity profiles of the particle as it flies past are measured, which is characteristic for the aerosol particle.

If the measuring device (80) is a measuring device for Raman and/or infrared (IR) spectroscopy (84), the material to be investigated is irradiated with monochromatic light, usually from a laser. In addition to the emitted frequency (Rayleigh scattering), further frequencies are observed in the spectrum of the light scattered at the sample. The frequency differences from the emitted light correspond to the energies of rotation, vibration, phonon or spin flip processes characteristic of the material. Information on the investigated substance can be drawn from the spectrum obtained, similarly to the infrared spectroscopy spectrum.

The methods of digital holography, time-resolved scattered light measurement with and without polarization measurement as well as Raman and/or IR spectroscopy are familiar to the person skilled in the art. He is also familiar with suitable assemblies. These are available commercially. He can also assemble suitable assemblies without unreasonable effort and without an inventive step.

The Method

The method according to the invention surprisingly allows a qualitative and/or quantitative investigation of the concentrated larger aerosol particles (3) in flight and in real time using a measuring device (80) of the measuring system (7) according to the invention wherein optionally a plurality of measuring devices (80) can also be combined with one another. Preferably used as the measuring device (80) is a measuring device i) for fluorescence measurement (81), ii) for digital holography measurement (82) iii) for time-resolved scattered light measurement (83), optionally with polarization measurement and/or iv) for Raman and/or IR spectroscopy (84).

The method according to the invention comprises that:

with the aerosol particle concentrator (1) the larger volume fraction of the aerosol (2) at normal pressure, i.e. at 25° C., 1 bar and 50% relative air humidity, with the fine particles (21) is separated off via the side outlet (42) of the virtual impactor stages (4, 4-1, 4-x) and optionally at least one further virtual impactor stage (4, 4-2), wherein the side outlet (42) of the at least one further (4-2) and/or of the last (4-x) virtual impactor stage (4) is connected to the circulating flow channel (64), the larger aerosol particles (3) are concentrated in the smaller part of the aerosol (2) and are guided through the sample outlet (43) of the first virtual impactor stage (4, 4-1), optionally via at least one further virtual impactor stage (4, 4-2) to the last virtual impactor stage (4, 4-x) and then to the measuring chamber (8) and the larger aerosol particles (3) in the measuring chamber (8) are investigated using the measuring device (80) for the qualitative and/or quantitative determination of the aerosol particles (3) in the gas phase and preferably in real time.

The method according to the invention additionally preferably comprises that:

using the aerosol suction pump (6) the aerosol (2) is sucked in via a first connecting channel (5-1) to the first virtual impactor stage (4-1) and is separated there into:

an aerosol with fine particles (21) which leads via the side outlet (42) of the impactor stage (4-1) via the aerosol inlet (61) to the aerosol suction pump (6) and an aerosol with the larger aerosol particles (3) which leads via the sample outlet (43) of the impactor stage (4-1) into a second connecting channel (5-2), a part (21-1) of the aerosol with fine particles (21) is led off after the aerosol outlet (62) of the aerosol suction pump (6) in the residual aerosol channel (63) and the other part (21-2) of the aerosol with fine particles (21) in the circulating flow channel (64) is returned to the aerosol inlet (61) of the aerosol suction pump (6), the aerosol with the larger aerosol particles (3) in the second connecting channel (5-2) is relayed to the sample inlet (41) of at least one further virtual impactor stage (4-2), wherein a part of the gas phase of the relayed aerosol (2), which can contain a part of non-separated residual fine particles (21), is led off via the side outlet (42) of the at least one further virtual impactor stage (4-2) and the aerosol with the larger aerosol particles (3) concentrated thereby is relayed through the sample outlet (43) of the at least one further virtual impactor stage (4-2) into the at least one further connecting channel (5-3), the gas phase led off via the side outlet (42) of the at least one further virtual impactor stage (4-2) is introduced into the circulating flow channel (64) and returned together to the aerosol inlet (61) of the aerosol suction pump (6), wherein the gas phase can typically contain the—or at least a large part of—the fine particles (21) not separated in the first impactor stage (4-1) and the concentrated aerosol particles (3) are guided from the sample outlet (43) of the last virtual impactor stage (4-x) in the aerosol flow direction through the measuring chamber (8) in order to investigate the aerosol particles (3) with the measuring device (80).

With the aerosol particle concentrator (1) of the measuring system (7) according to the invention (7) and the method according to the invention, in addition preferably the larger aerosol particles (3) of the smaller volume fraction of the aerosol at normal pressure can be concentrated by a factor of at least 50, preferably by a factor of at least 200 and in particular, and surprisingly, by a factor of at least 500 or more.

In a further preferred embodiment of the method according to the invention, the residual aerosol chamber (63) after the measuring chamber (8) is supplied to the sample outlet of the measuring chamber (8), with the result that one part (21-1) of the aerosol with fine particles (21) is combined with the aerosol particles (3) and the smaller volume fraction of the aerosol (2) at normal pressure and is optionally conveyed via the further aerosol suction pump (9) from the measuring system (7). Thus, if necessary, all the particles, i.e. all the fine particles (21) and all the larger aerosol particles (3) can be guided out of the device jointly through an opening.

In another preferred embodiment of the method, the aerosol suction pump (6) of the aerosol particle concentrator (1) is set so that in particular by means of pump power of the aerosol suction pump (6) and/or at least one flow regulating valve in the residual aerosol channel (63), at the aerosol inlet (61) and thus substantially also at the side outlet (42) of the first virtual impactor stage (4-1), a negative pressure is produced relative to the external pressure of the concentrator (1) of 30 to 10,000 Pa, in particular of 100 to 400 Pa. This results in an optimal negative pressure in the measuring system (1) in order surprisingly to suction off on the one hand as far as possible no larger aerosol particles (3) but a sufficiently large fraction of fine particles (21) of the aerosol (2) via the aerosol suction pump (6). Also, the aerosol particles (3) can flow optimally through the measuring chamber (8) at these negative pressures. In addition, it allows an optimal functioning of the circulating-flow channel (64). This could not be expected in this manner.

The Use

The measuring system (7) according to the invention and the method according to the invention can surprisingly be used very flexibly. They are exceptionally suitable for investigating aerosols (2), in particular concentrated larger aerosol particles (3) of the aerosols (2) in the gas phase and preferably in real time.

The use according to the invention is particularly suitable if the aerosol (2) is a primary or secondary aerosol, a mist, an atmospheric aerosol, an indoor aerosol, an industrial aerosol, a technical aerosol, a natural organic and/or inorganic aerosol and/or if the aerosol particles (3) of the aerosol (2) comprise pollen, spores, bacteria, viruses, solid or liquid suspended particles, dusts such as suspended dust, desert and/or mineral dust and/or ash such as volcanic ash.

The use according to the invention of the measuring system (7) according to the invention allows the direct measurement of aerosol particles dispersed in the gas phase and therefore of aerosol particles in flight. This is because due to the aerosol particle concentrator (1) deployed and used according to the invention, the aerosol particles (3) can be highly concentrated, which enables an extremely effective measurement of the same in flight and in real time. By means of a suitable selection of at least one measuring device (80), the most optimal measuring method can be selected to analyze the aerosol particles (3).

The following reference numbers are used:
1 Multi-stage aerosol particle concentrator
2 Aerosol
21 Fine particles of the aerosol (2)
21-1 A part of the aerosol with fine particles
21-2 Another part of the aerosol with fine particles
3 Larger aerosol particles
4 Virtual impactor stages
4-1 First virtual impactor stage
4-2 Further virtual impactor stage
4-x Last virtual impactor stage
41 Sample inlet of virtual impactor stage (4)
42 Side outlet of virtual impactor stage (4)
43 Sample outlet of virtual impactor stage (4)
5 Connecting channel
5-1 First connecting channel
5-2 Second connecting channel
5-3 Further connecting channel
6 Aerosol suction pump
60 Radial fan
61 Aerosol inlet of aerosol suction pump (6)
62 Aerosol outlet of aerosol suction pump (6)
63 Residual aerosol channel
64 Circulating-flow channel
65 Static pressure distributing arrangement
65a Walls with a plurality of openings
65b Walls without openings
65c Openings to circulating-flow channel (64)

66 Air pump of pressure distributing arrangement (65)
66*a* Intake opening of air pump (66) in the pressure distributing plate (65)
66*b* Aerosol return inlet of air pump (66)
7 Measuring system
71 Measuring system inlet
72 Measuring system outlet
8 Measuring chamber
80 Measuring device for qualitative and/or quantitative determination of the aerosol particles (3) in real time
81 Device for fluorescence measurement
82 Device for digital holography measurement
83 Device for time-resolved scattered light measurement
84 Device for Raman and/or IR spectroscopy
9 Further aerosol suction pump (9)

Non-limiting preferred embodiments of the measuring system (7) according to the invention with multi-stage aerosol particle concentrator (1) and measuring chamber (8) are described hereinafter with reference to the following drawings. These should not be interpreted as restrictive and are understood as part of the description:

FIG. 1 shows as an example and schematically a part of the measuring system (7) according to the invention with measuring system inlet (71) and measuring system outlet (72) comprising the multi-stage aerosol particle concentrator (1; shown by the dashed line) with aerosol suction pump (6) and circulating-flow channel (64), as well as the measuring chamber (8). The measuring system (7) with circulating-flow channel (64) is advantageously cylindrical, wherein the virtual impactor stages (4, 4-1, 4-2, 4-*x*), the connecting channels (5, 5-1, 5-2, 5-3) and the measuring chamber (8) are located in series and advantageously linearly in the centre of the cylindrical arrangement. Thus, the aerosol suction pump (6), the circulating-flow channel (64) and the residual aerosol channel (63) show a section from inside to outside of the one side of the measuring system (7). In this case, the regions which in the diagram are, for example, completely enclosed by the circulating-flow channel (64) and by the residual aerosol channel (63) are held at certain points by fine connecting elements (not shown) in order to give the measuring system with circulating-flow channel (64) the necessary stability.

The aerosol suction pump (6) can be in the form of a radial fan (60) or another pump. It produces a negative pressure in the measuring system (7), with the result that the aerosol (2) is sucked in via a first connecting channel (5, 5-1) to the sample inlet (41) of the first virtual impactor stage (4-1). There the larger part of the aerosol (2) with fine particles (21) is separated via the side outlet (42) of the virtual impactor stage (4) and thus, the larger aerosol particles (3) are concentrated in the smaller part of the aerosol (2). The larger aerosol particles (3) and the smaller part of the aerosol (2) flow through the sample outlet (43) of the virtual impactor stage (4-1) which is usually arranged opposite the sample outlet (41). From the sample outlet (43) of the first virtual impactor stage (4-1), the aerosol particles (3) with the smaller part of the aerosol (2) pass to the second connecting channel (5, 5-2) which connects the sample outlet (43) of the first virtual impactor stage (4-1) to the sample inlet (41) of the second, i.e. of a further virtual impactor stage (4-2). This, like any other, separates, similar to the first impactor stage (4-1), the larger fraction, i.e. at least 73 vol. %, preferably 83 vol. % or more of the remaining gas phase of the smaller part of the aerosol (2) via the side outlet (42). If all the fine particles (21) were not separated at the previous impactor stage (4), the latter, or at least the largest part thereof, are also separated via the side outlet (42).

If the measuring device (7) comprises further virtual impactor stages (4-2, 4-*x*), these are advantageously arranged in the same manner in series.

The larger part of the aerosol (2) with fine particles (21) separated via the side outlet (42) of the first virtual impactor stage (4-1) passes via the aerosol inlet (61) to the aerosol suction pump (6) and further to the aerosol outlet (62). From there a part (21-1) of the aerosol with fine particles (21) is led off in the residual aerosol channel (63) and for example, after the measuring chamber (8) is combined with the connecting channel which connects the measuring chamber (8) to the depicted optional further aerosol suction pump (9). As a result, the measuring system (7) has only one sample outlet. This is particularly advantageous if the larger aerosol particle (3) and/or the fine particles (21) are filtered out before the sample outlet.

After the aerosol outlet (62), the other part (21-2) of the aerosol with fine particles (21) is returned in the circulating-flow channel (64) to the aerosol inlet (61) of the aerosol suction pump (6). The side outlet (42) of the at least one further virtual impactor stage (4-2) is connected to the circulating-flow channel (64) and removes a part of the gas phase which can optionally contain fine particles (21). As a result of the negative pressure generated by the aerosol suction pump (6), a negative pressure is also produced in the circulating-flow channel (64) through which the gas phase led off via the side outlet (42) of the further impactor stage (4-2) and optionally the fine particles (21) dispersed therein are suctioned, combined with the other part (21-2) of the aerosol with fine particles (21) located in the circulating-flow channel (64) and returned jointly to the aerosol inlet (61) of the aerosol suction pump (6).

In FIG. 1 additionally as an example and optionally, a part of the circulating-flow channel (64) is branched off and after the further connecting channel (5, 5-3) after the sample outlet (43) is supplied as sheath flow to the second and therefore, for example, last virtual impactor stage (4-2, 4-*x*) in the aerosol flow direction. The sheath flow results in a further focussing of the larger aerosol particles (3) in the centre of the measuring chamber (8), which results in an even better measurement of almost all the aerosol particles (3). On the other hand, the fine particles (21) which are added as sheath flow from the circulating flow of the circulating-flow channel (64) have no negative interfering effect for the measurement.

Also for example and optionally the residual aerosol channel (63) is combined with the sample outlet (43) after the measuring chamber (8). As a result, the one part (21-1) of the aerosol with fine particles (21) guided in the residual aerosol channel (63) is combined with the aerosol particles (3) and the smaller volume fraction of the aerosol (2) at normal pressure after the measuring chamber (8) and conveyed jointly, optionally via the further aerosol suction pump (9), from the measuring system (7). Thus, all the particles can be withdrawn from the aerosol to be led off with the result that the gas flowing into the environment no longer contains any particles.

The volume flow of the part of the aerosol with fine particles (21) can additionally be measured with suitable flow meters and the flow regulated. As a result, the volume flow of the circulating current in the circulating-flow channel (64) can also be regulated.

FIG. 2 shows as an example a cross-section of the mechanical structure of an embodiment of the multi-stage aerosol particle concentrator (1) with measuring system inlet (71) and circulating-flow channel (64) with a total of three virtual impactor stages (4, 4-1, 4-2, 4-*x*). The aerosol particle concentrator (1) has an aerosol suction pump (6) in the form of a radial fan (60). A part of the aerosol with fine particles (21-1) is led off through the residual aerosol channel (63). The circulating-flow channel (64) contains a part of the aerosol with fine particles (21-2). A part of the aerosol with fine particles (21-2) forms the sheath flow which is added before the measuring chamber (8) to the smaller part of the aerosol (2) with the larger aerosol particles (3).

The part of the aerosol with fine particles (21-2) which does not lead into the sheath flow (21-2) is guided after the branching-off of the sheath flow and the virtual impactor stages (4, 4-1, 4-2, 4-x) to the aerosol inlet (61) of the aerosol suction pump (6). In this case, the side outlets (42) of the further and last virtual impactor stages (4-2, 4-x) are connected to the circulating-flow channel (64), with the result that the part of the gas phase of the aerosol with optionally fine particles (21) separated at the impactor stages (4-2, 4-x) opens into the circulating-flow channel (64) and from there is guided to the aerosol inlet (61) of the aerosol suction pump (6).

Hatched areas which in the diagram, for example, are completely enclosed by virtual impactor stages (4), side outlets (42), connecting channel (5), residual aerosol channel (63) and/or circulating-flow channel (64), are held at points using fine connecting elements with the opposite wall (not shown) in order to give the multi-stage aerosol particle concentrator (1) with circulating-flow channel (64) the necessary stability.

A part of the circulating-flow channel (64) is branched-off for example and after the last virtual impactor stage (4, 4-x) and after the further connecting channel (5, 5-3) is supplied as sheath flow to the aerosol with the larger aerosol particles.

Figure 2:
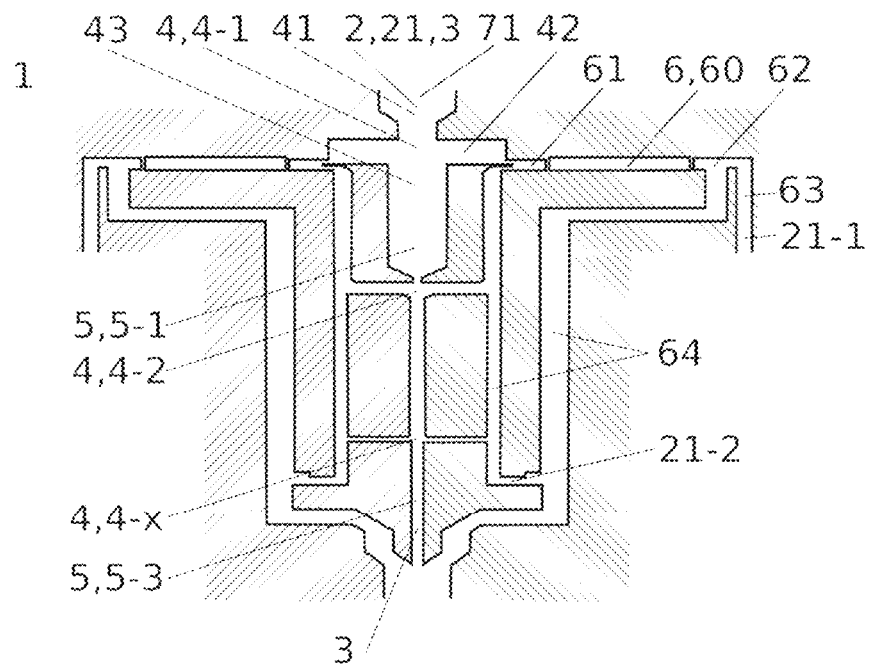
FIG. 2 shows as an example a cross-section of the mechanical structure of an embodiment of the multi-stage aerosol particle concentrator with measuring system inlet and circulating-flow channel.
Figure 3:
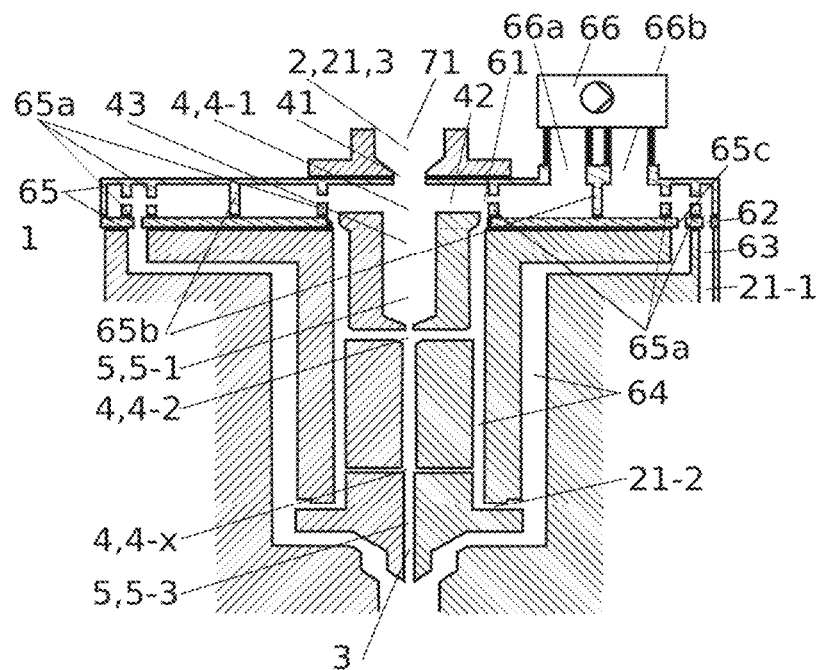
FIG. 3 shows a cross-section of the mechanical structure of the multi-stage aerosol particle concentrator with measuring system inlet and circulating-flow channel.

FIG. 3 shows, similarly to FIG. 2, a cross-section of the mechanical structure of the multi-stage aerosol particle concentrator (1) with measuring system inlet (71) and circulating-flow channel (64) with a total of three virtual impactor stages (4, 4-1, 4-2, 4-x), wherein the aerosol suction pump (6) is configured in the form of a static pressure distributing arrangement (65) with air suction pump (66; not shown).

The static pressure distributing arrangement (65), for example, has walls with a plurality of openings (65a), walls without an opening (65b) as well as openings to the circulating-flow channel (64), at least one intake opening (66a) of the air pump (66), at least one aerosol return inlet (66b) of the air pump (66) and at least one aerosol outlet (62) of the pressure distributing arrangement (65), i.e. the aerosol suction pump (6).

The aerosol (2) with the fine particles (21; not shown) is deflected by 90° as a result of the suction effect of the air pump (66) in the first virtual impactor stage (4-1) and suctioned through the side outlet (42) of the virtual impactor stage (4-1) in the aerosol inlet (61) and thus into the first region (shown grey) of the pressure distributing arrangement (65) and from there again—by means of gas outlet pressure—pressed through the aerosol return inlet (66b) into the second region (white, outer region of the pressure distributing arrangement (65)). From there a part of the aerosol with fine particles (21-1) passes through the aerosol outlet (62) into the residual aerosol channel (63). The other part of the aerosol with fine particles (21-2) passes via the at least one opening (65c) into the circulating-flow channel (64) and from there back again to the aerosol inlet (61).

A part of the circulating-flow channel (64) is branched off, for example, and after the last virtual impactor stage (4, 4-x) and after the further connecting channel (5, 5-3) is supplied as sheath flow to the larger aerosol particles (3).

FIG. 4 shows as an example a radial fan (60) with axial passage in the form of an external rotor motor with hollow shaft.

FIG. 5 shows as an example the installation of the radial fan (60) in the multi-stage aerosol particle concentrator (1) in the region of the first virtual impactor stage (4-1).

FIG. 5a shows the cross-section of the stator of the radial fan (60).

FIG. 5b shows the cross-section of the rotor of the radial fan (60).

FIG. 5c shows the cross-section of the turbine wheel of the radial fan (60) which is mounted on the rotor of the external rotor motor.

FIG. 5d shows the cross-section of the multi-stage aerosol particle concentrator (1) in the region of the first virtual impactor stage (4-1) in which the radial fan (60) is installed.

FIG. 5e shows the cross-section of the radial fan (60) with stator, rotor and turbine wheel installed in the region of the first virtual impactor stage (4-1) of the multi-stage aerosol particle concentrator (1).

Figure 6:
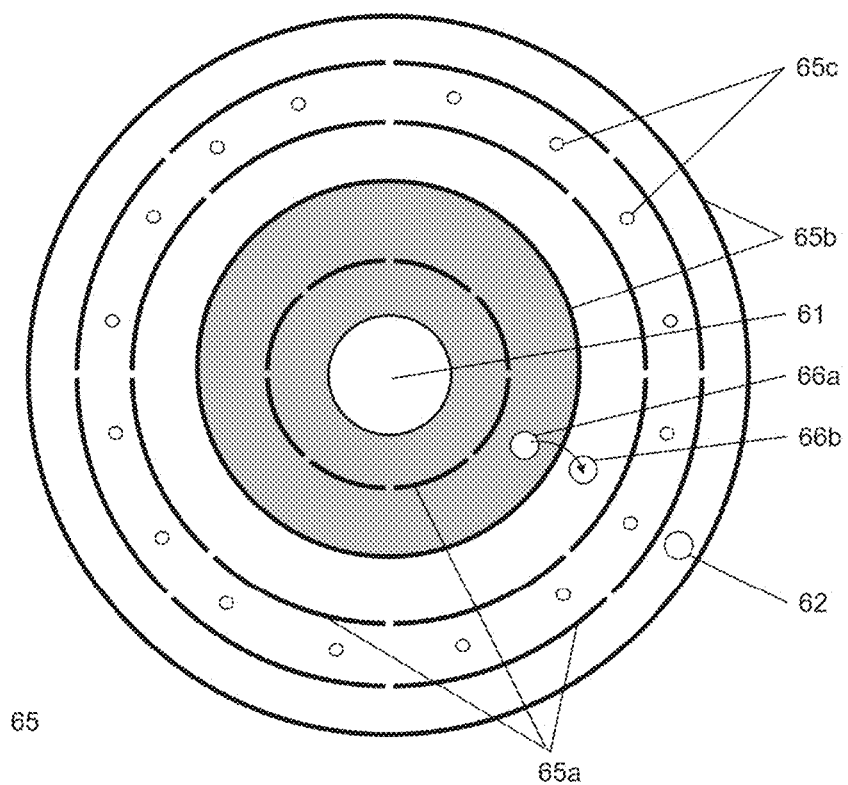
FIG. 6 shows as an example a static pressure distributing arrangement through which the larger part of the aerosol with fine particles.

FIG. 6 shows as an example a static pressure distributing arrangement (65) through which the larger part of the aerosol (2) with fine particles (21; not shown) which pass through the measuring system inlet (71) into the measuring system (7, not shown) can flow.

The pressure distributing arrangement (65) together with the air pump (66; not shown) forms the aerosol suction pump (6; not shown) and has at the centre an aerosol inlet (61) and an adjoining first region (shown grey). Located in this first region is the intake opening of the air pump (66) as well as walls having a plurality of openings (65a). These serve as a device to distribute the negative pressure generated by the air pump (66) as uniformly as possible in the first region. The one part of the aerosol (2) with fine particles (21) sucked in by the air suction pump (66) is guided through the aerosol return inlet (66b) into a second region which is separated from the first region by a wall without an opening (65b). This second region comprises at least one aerosol outlet (62) through which the aerosol (2) together with the fine particles (21) is guided to the residual aerosol channel (63) and a plurality of opening (65c) to the circulating-flow channel (64). In this case, the aerosol return inlet (66b), the aerosol outlet (62) and the at least one opening (65c) with at least one device are advantageously separated from one another in order to optimally distribute the pressure differences produced by the various inlet/outlets of the aerosol (2) with fine particles (21). The pressure distributing arrangement (65) is additionally delimited towards the outside advantageously also with a wall (65b) without openings.

Figure 7:
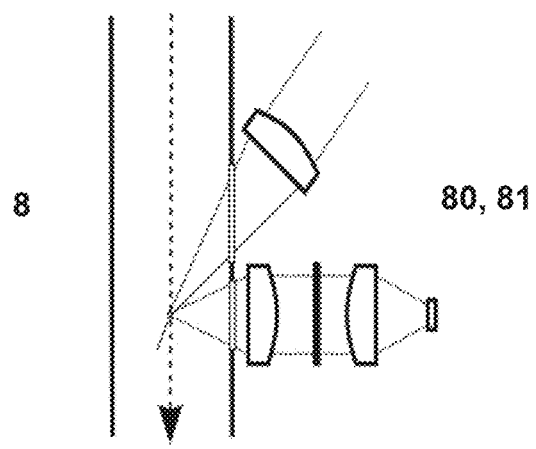
FIG. 7 shows the measuring chamber with a device shown as an example for the fluorescence measurement as measuring device for the qualitative and/or quantitative determination of the aerosol particles.

FIG. 7 shows the measuring chamber (8) with a device shown as an example for the fluorescence measurement (81) as measuring device (80) for the qualitative and/or quantitative determination of the aerosol particles (3; not shown) in real time and in flight. The arrow indicates the flight direction of the aerosol particles (3). If a sheath flow is used, the larger aerosol particles (3) to be investigated are centred in the centre of the measuring chamber which enables a more efficient and more precise measurement of all the aerosol particles (3). The fine particles (21'; not shown) in the sheath flow do not adversely affect the measurement results or only insignificantly.

The exciting light of the device for fluorescence measurement (81) comes from a light source from top right (not shown) and is focused by a lens through a window in the measuring chamber wall in the measuring chamber (8) onto the flight path of the aerosol particles (3). The aerosol particle (3) absorbs the light and emits a part thereof, i.e. the fluorescence light again. The latter emerges through the lower right window and is collimated with the aid of two lenses and deflected onto a receiver which is shown on the bottom right outside the measuring chamber (8). An optical filter, for example, is mounted between the two lenses.

FIG. 8 shows the measuring chamber (8) with a device for digital holography measurement (82) shown as an example as measuring device (80) for the qualitative and/or quantitative determination of the aerosol particles (3) in real time and in flight.

FIG. 8*a* shows the optical setup for the holography measurement (82) from the side, wherein the arrow indicates the flight direction of the particles to be investigated. The depicted arrangement is also designated as an in-line or Gabor method.

The left rectangular element forms the light source. The emitted coherent light is collimated by a lens, i.e. focused. The light beam then enters into the measuring channel (8) through a window in the measuring channel wall. The light diffracted by the aerosol particle (3; not shown) interferes with the light of the light source and emerges on the opposite side through a window from the measuring channel and is guided by a further lens onto the imaging receiver. In addition, scattered light emitted by the aerosol particle is received by the trigger receiver which is arranged on the top left. The trigger receiver initiates the resulting holographic recording wherein the recorded image is a digital image, i.e. it comprises digital holography.

FIG. 8*b* shows a cross-section through the circularly depicted measuring chamber (8) and through the measuring device (80). Shown is a set-up with two in-line arrangements for digital holography measurement (82), wherein the arrangements can be arranged offset in the flight direction of the aerosol particles (3; not shown), with the result that the speed of the aerosol particles (3) in flight can be additionally measured. The angle between two setups is, for example, 90°, wherein it can also have a different angle in the range of greater than 1° to less than 180°. Located between the two imaging receivers is a trigger receiver which receives light from the two light sources which was scattered at the aerosol particles (3). The angle between the holography set-up and the trigger set-up can be arbitrarily selected.

Figure 9:
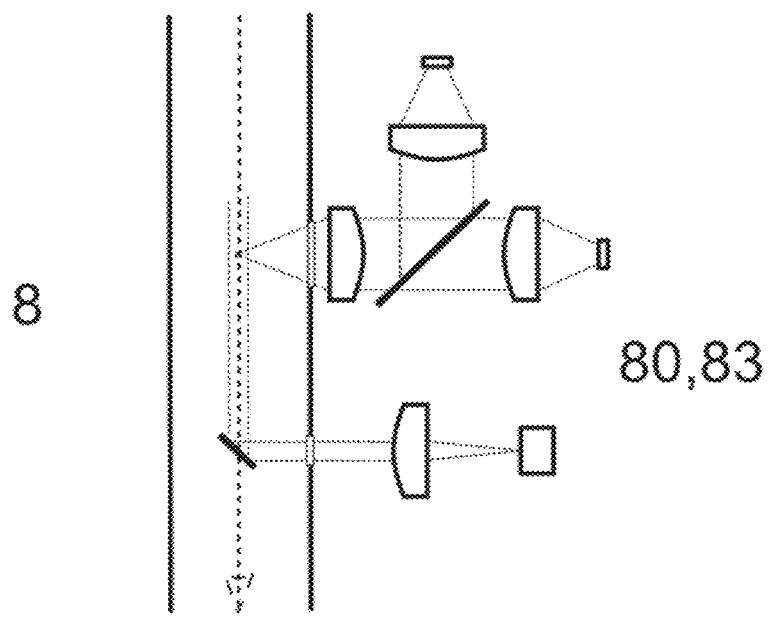
FIG. 9 shows the measuring chamber with a device shown as an example for time-resolved scattered light measurement.

FIG. 9 shows the measuring chamber (8) with a device shown as an example for time-resolved scattered light measurement (83), including polarization measurement as measuring device (80) for the qualitative and/or quantitative determination of the aerosol particles (3; not shown) in real time and in flight.

The exciting light source bottom right produces the exciting light which is collimated by a lens and is guided through a window into the measuring channel. A mirror deflects the light upwards, for example, 90° with the result that the exciting light illuminates the aerosol particles (3) towards their flight path. Thus the aerosol particles (3) are illuminated as they fly past, with the result that scattered light is produced. A part of the scattered light produced is guided via the upper window in the wall of the measuring chamber (8) and collimated by means of a lens and deflected, for example, onto a polarization filter which filters the light and separates it into light having vertical polarization and light having horizontal polarization. One part of the light is deflected by 90°, the differently polarized part of the light continues further in the same direction as the incident light. Both differently polarized light beams are focused using an additional lens onto a respectively separate receiver and detected.

Figure 10:
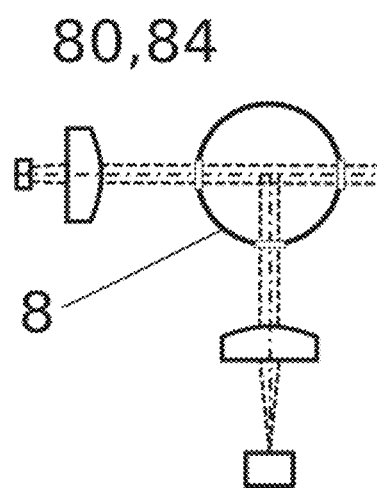
FIG. 10 shows schematically a cross-section through the circularly depicted measuring chamber and through the measuring device.

FIG. 10 shows schematically a cross-section through the circularly depicted measuring chamber (8) and through the measuring device (80), wherein the measuring device (80 is an arrangement for Raman and/or infrared (IR) spectroscopy (84). In this case, a laser beam from a laser source (far left) is collimated by means of a lens (arranged between laser source and measuring chamber (8)) and guided through a window into the measuring chamber (8) of the measuring system (1). On the opposite side of the measuring chamber (8), the non-excited part of the laser emerges from the measuring chamber (8) again. In the centre of the measuring chamber (8) a part of the laser beam impinges upon the larger aerosol particles (3; not shown), wherein these are excited by the laser beam. This in turn results in the emission of light having a different wavelength in all directions. A part of the emitted light passes through a further window (for example, shown at an angle of 90° in relation to the emitted light) out from the measuring chamber (8), where it is focused by means of an additional lens and relayed to the detector of the spectrometer of the Raman and/or IR spectroscopy (84) and then analyzed.

The invention claimed is:

1. A measuring system a measuring system inlet and a measuring system outlet for investigating concentrated, larger aerosol particles of an aerosol in a gas phase comprising:
    a multi-stage aerosol particle concentrator for separating fine particles and a part of the gas phase of the aerosol;
    a measuring chamber for analyzing the larger aerosol particles, wherein:
        the measuring chamber comprises at least one measuring device for the qualitative and quantitative determination of the aerosol particles in real time, and
        the aerosol particle concentrator comprises a first and at least one last virtual impactor stage, each having a sample inlet, a side outlet and sample outlet, wherein the virtual impactor stages separate a larger part of the aerosol with fine particles and concentrate the larger aerosol particles in the smaller part of the aerosol, wherein the aerosol particle concentrator;
    comprises an aerosol suction pump having an aerosol inlet and aerosol outlet for generating a negative pressure in the virtual impactor stages, wherein the side outlet of the first virtual impactor stage is connected to the aerosol inlet, as well as
    a circulating-flow channel in which a part of the separated aerosol with fine particles is returned in the circulating flow from the aerosol outlet to the aerosol inlet of the aerosol suction pump, wherein the side outlet of at least one further and of the last virtual impactor stage is connected to the circulating-flow channel.

2. The measuring system according to claim 1, wherein:
    i) the aerosol suction pump is a radial fan or a static pressure distributing arrangement with air pump, wherein an aerosol intake opening is arranged in the center of the radial fan or in the center of the static pressure distributing arrangement.

3. The measuring system according to claim 1, wherein the larger aerosol particles have a particle diameter of at least 1 µm, measured by light diffraction in accordance with ISO13320:2009.

4. The measuring system according to claim 1, wherein the measuring device for analysis of the larger aerosol particles constitutes at least one measuring device i) for fluorescence measurement, ii) for digital holography measurement, iii) for time-resolved scattered light measurement for Raman and/or infrared spectroscopy.

5. The measuring system according to claim 1, wherein the aerosol particle concentrator comprises at least two virtual impactor stages, each having a sample inlet side outlet and sample outlet as well as at least three connecting channels separated from one another by the impactor stages.

6. The measuring system according to claim 5, wherein the aerosol outlet of the aerosol suction pump is connected both a) to a residual aerosol channel, which removes a part of the sucked-in aerosol with aerosol fine particles and also to b) a circulating flow channel, wherein the circulating flow channel returns the other part of the sucked-in aerosol with aerosol fine particles in the circulating flow to the aerosol inlet of the aerosol suction pump.

7. The measuring system according to claim 1, wherein the virtual impactor stages satisfy the following conditions:

$$(St)^{1/2} \geq 0.4 \quad (1)$$

wherein $$St = (d_p^2 \cdot C \cdot u_j \cdot p_p)/(9 \cdot I \cdot \mu) \quad (2)$$

and St=stokes number [-],
$d_p$=cut-off diameter of the aerosol particles (3) to be concentrated [m],
C=cunningham factor [-]
$u_j$=mean jet speed [m/s]
$\rho_p$=density of the particles [kg/m³]
I=nozzle diameter [m] of the sample inlet
$\mu$=dynamic fluid viscosity [Pa·s].

8. The measuring system according to claim 1, wherein the sample outlet, a sheath flow, is supplied to the last virtual impactor stage in the outflow direction, wherein the sheath flow i) forms a part branched off from the circulating flow channel, or ii) the residual aerosol channel or a part thereof.

9. A method for investigating concentrated larger aerosol particles of an aerosol using a measuring system according to claim 1, wherein:
with the aerosol particle concentrator the larger volume fraction of the aerosol at normal pressure with the fine particles is separated off via the side outlet of the virtual impactor stages and at least one further virtual impactor stage wherein the side outlet of the at least one further and/or of the last virtual impactor stage is connected to the circulating flow channel,
the larger aerosol particles are concentrated in the smaller part of the aerosol and are guided through the sample outlet of the first virtual impactor stage, and
the larger aerosol particles in the measuring chamber are investigated using the measuring device for the qualitative and quantitative determination of the aerosol particles in the gas phase and in real time.

10. The method according to claim 9, wherein:
using the aerosol suction pump, the aerosol, is sucked in via a first connecting channel to the first virtual impactor stage and is separated there into:
an aerosol with fine particles which leads via the side outlet of the impactor stage via the aerosol inlet to the aerosol suction pump and
an aerosol with the larger aerosol particles which leads via the sample outlet of the impactor stage into a second connecting channel,
a part of the aerosol with fine particles is led off after the aerosol outlet of the aerosol suction pump and the other part of the aerosol with fine particles in the circulating flow channel is returned to the aerosol inlet of the aerosol suction pump,
the aerosol with the larger aerosol particles in the second connecting channel is relayed to the sample inlet of at least one further virtual impactor stage, wherein a part of the gas phase of the relayed aerosol is led off via the side outlet of the at least one further virtual impactor stage and the aerosol with the larger aerosol particles concentrated thereby is relayed through the sample outlet of the at least one further virtual impactor stage into the at least one further connecting channel,
the gas phase led off via the side outlet of the at least one further virtual impactor stage is introduced into the circulating flow channel and returned together to the aerosol inlet of the aerosol suction pump, and the concentrated aerosol particles are guided from the sample outlet of the last virtual impactor stage in the aerosol flow direction through the measuring chamber in order to investigate the aerosol particles with the measuring device.

11. The method according to claim 9, wherein the larger aerosol particles in the smaller volume fraction of the aerosol at normal pressure are concentrated with the aerosol particle concentrator by a factor of at least 50.

12. The method according to claim 9, wherein the residual aerosol channel after the measuring chamber is supplied to the sample outlet of the measuring chamber, with the result that one part of the aerosol with fine particles is combined with the aerosol particles and the smaller volume fraction of the aerosol at normal pressure.

13. The method according to claim 12, wherein the residual aerosol channel after the measuring chamber is supplied to the sample outlet of the measuring chamber and further conveyed via a second aerosol suction pump from the measuring system.

14. The method according to claim 9, wherein the aerosol suction pump of the aerosol particle concentrator is set so that by means of pump power and/or flow regulating valves in the residual aerosol channel, at the aerosol inlet and therefore substantially also at the side outlet of the first virtual impactor stage, a negative pressure is produced relative to the external pressure of the concentrator 30 to 10,000 Pa.

15. The measuring system according to claim 1, wherein the measuring system comprises a further aerosol suction pump which is arranged between the measuring chamber and the measuring system outlet.

16. The method according to claim 9, wherein:
with the aerosol particle concentrator the larger volume fraction of the aerosol at normal pressure with the fine particles is separated off via the side outlet of the virtual impactor stages and at least one further virtual impactor stage, and
the larger aerosol particles are concentrated in the smaller part of the aerosol and are guided through the sample outlet of the first virtual impactor stage via at least one further virtual impactor stage to the last virtual impactor stage and then to the measuring chamber.

17. The method according to claim 9, wherein the larger aerosol particles in the smaller volume fraction of the aerosol at normal pressure are concentrated with the aerosol particle concentrator by a factor of at least 500.

18. The method according to claim 9, wherein the aerosol suction pump of the aerosol particle concentrator is set so that by means of pump power and/or flow regulating valves in the residual aerosol channel, at the aerosol inlet and therefore substantially also at the side outlet of the first virtual impactor stage, a negative pressure is produced relative to the external pressure of the concentrator of 100 to 400 Pa.

* * * * *